United States Patent
Kothamasu et al.

(10) Patent No.: US 8,667,196 B2
(45) Date of Patent: Mar. 4, 2014

(54) INTERCONNECT CONGESTION REDUCTION FOR MEMORY-MAPPED PERIPHERALS

(75) Inventors: Srinivasa Rao Kothamasu, Bangalore (IN); Debjit Roy Choudhury, West Bengal (IN); Dharmesh Kishor Tirthdasani, Bangalore (IN); Sajith Kizhakke Kalathil Achuthan Kutty, Bangalore (IN); Jean Jacob, Kerala (IN)

(73) Assignee: LSI Corporation, San Jose, CA (US)

( * ) Notice: Subject to any disclaimer, the term of this patent is extended or adjusted under 35 U.S.C. 154(b) by 109 days.

(21) Appl. No.: 13/455,744

(22) Filed: Apr. 25, 2012

(65) Prior Publication Data
US 2013/0290582 A1 Oct. 31, 2013

(51) Int. Cl.
*G06F 13/00* (2006.01)
(52) U.S. Cl.
USPC .......................................... 710/110; 370/402
(58) Field of Classification Search
USPC ............................... 710/110, 9; 370/400–403
See application file for complete search history.

(56) References Cited

U.S. PATENT DOCUMENTS

2013/0077635 A1* 3/2013 Deivasigamani et al. .... 370/402

* cited by examiner

*Primary Examiner* — Clifford Knoll
(74) *Attorney, Agent, or Firm* — Otterstedt, Ellenbogen & Kammer, LLP (57) ABSTRACT

A method and apparatus are provided for mapping addresses between one or more slave devices and at least one corresponding master device in a multilayer interconnect system including a plurality of bus matrices for interfacing between the one or more slave devices and the master device. The method and apparatus are operative for receiving an address map corresponding to the system, receiving information regarding connectivity of one or more slave devices through at least one of the bus matrices, determining whether the master device has more than one default slave unit associated therewith, and, when the master device has more than one default slave unit associated therewith, generating first and second address mappings and configuring the system to have no more than one default slave unit per master device.

21 Claims, 4 Drawing Sheets

INTERCONNECT CONGESTION REDUCTION FOR MEMORY-MAPPED PERIPHERALS

BACKGROUND

In a typical multi-layer and/or multi-level interconnect system, peripherals, memory, and/or other slave components are addressed by a master component (e.g., processor, server, interface device, etc.) using a system memory map. As is well known, a memory map is essentially a data structure, often residing in memory itself, which is used for defining how an operating system allocates (i.e., shares) the main memory space in the system.

In general, some peripherals are specific to a corresponding master, and other peripherals are shared among multiple masters. All masters and slaves generally interact with one another using defined bus protocols. Typical access logic between masters and slaves include protocol conversion, bus arbitration, peripheral address decoding, protection checks, etc. Unfortunately, conventional approaches to master/slave interaction are often complex and utilize significant area in an integrated circuit (IC), among other disadvantages.

SUMMARY

Embodiments of the invention advantageously provide a novel memory mapping method and apparatus for use in a multilayer and/or multilevel interconnect system. Embodiments of the invention are operative to perform system memory mapping in a manner which advantageously simplifies peripheral address decoding logic, reduces the number of default slave units required for generating decoding error responses, reduces integrated circuit area, and improves critical peripheral access timing close to the processor/master interface, among other benefits.

In accordance with an embodiment of the invention, a method is provided for mapping addresses between one or more slave devices and at least one corresponding master device in a multilayer interconnect system, the system including a plurality of bus matrices for interfacing between the one or more slave devices and the at least one master device. The method includes the steps of: receiving an address map corresponding to the system; receiving information regarding connectivity of at least a subset of the one or more slave devices through at least one of the plurality of bus matrices; and determining whether the at least one master device has more than one default slave unit associated therewith. When the master device has more than one default slave unit associated therewith, the method further performs the steps of: generating a first address mapping defining a correspondence between an address space utilized by the at least one master device and an address space utilized by a corresponding bus matrix that does not require a default slave unit; generating a second address mapping defining a correspondence between an address space utilized by the bus matrix that does not require a default slave unit and an address space used to access a corresponding one of the slave devices, such that an address generated by the at least one master device and an address seen by a corresponding one of the slave devices is the same; and configuring the system to have no more than one default slave unit per master device.

In accordance with another embodiment of the invention, an apparatus is provided for facilitating address mapping between at least one master device and one or more corresponding slave devices in a multilayer interconnect system, the system including a plurality of bus matrices for interfacing between the one or more slave devices and the at least one master device. The apparatus includes a plurality of address swapping modules. A first subset of the address swapping modules is connected between the master device and corresponding bus matrices that do not require a default slave unit. A second subset of the address swapping modules is connected between the corresponding bus matrices that do not require a default slave unit and corresponding slave devices. The address swapping modules are adapted to perform at least one of: generating a first address mapping defining a correspondence between an address space utilized by the at least one master device and an address space utilized by a corresponding bus matrix that does not require a default slave unit; and generating a second address mapping defining a correspondence between an address space utilized by the bus matrix that does not require a default slave unit and an address space used to access a corresponding one of the slave devices, such that an address generated by the at least one master device and an address seen by a corresponding one of the slave devices is the same. The address swapping modules are configured so as to eliminate a need for the master device to have more than one default slave unit operatively coupled therewith.

In accordance with yet another embodiment of the invention, a multilayer interconnect system includes at least one master device, a plurality of slave devices, a plurality of bus matrices operative to interface between the slave devices and the master device, and a plurality of address swapping modules. A first subset of the address swapping modules is connected between the master device and corresponding bus matrices that do not require a default slave unit. A second subset of the address swapping modules is connected between the corresponding bus matrices that do not require a default slave unit and corresponding slave devices. The address swapping modules are adapted to perform at least one of: generating a first address mapping defining a correspondence between an address space utilized by the at least one master device and an address space utilized by a corresponding bus matrix that does not require a default slave unit; and generating a second address mapping defining a correspondence between an address space utilized by the bus matrix that does not require a default slave unit and an address space used to access a corresponding one of the slave devices, such that an address generated by the at least one master device and an address seen by a corresponding one of the slave devices is the same. The address swapping modules are configured so as to eliminate a need for the master device to have more than one default slave unit operatively coupled therewith.

Embodiments of the invention will become apparent from the following detailed description thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Embodiments of the invention will be described herein in the context of illustrative methods and/or apparatus for performing system memory mapping in a manner which advantageously simplifies peripheral address decoding, reduces the number of default slave units required for generating decoding error responses, reduces integrated circuit area, and improves critical peripheral access timing close to the processor/master interface, among other benefits. It should be understood, however, that embodiments of the invention are not limited to these or any other particular methods and/or apparatus. While embodiments of the invention may be described herein with reference to specific address mappings, as shown by way of illustration only in Tables 1 through 8 below, it is to be understood that the embodiments of the invention are not limited to the mappings shown and described herein, and that aspects of the embodiments of the invention may be performed using other memory mappings, as will become apparent to those skilled in the art. Moreover, it will become apparent to those skilled in the art given the teachings herein that numerous modifications can be made to the embodiments shown that are within the scope of the claimed invention. That is, no limitations with respect to the embodiments shown and described herein are intended or should be inferred.

Figure 1:
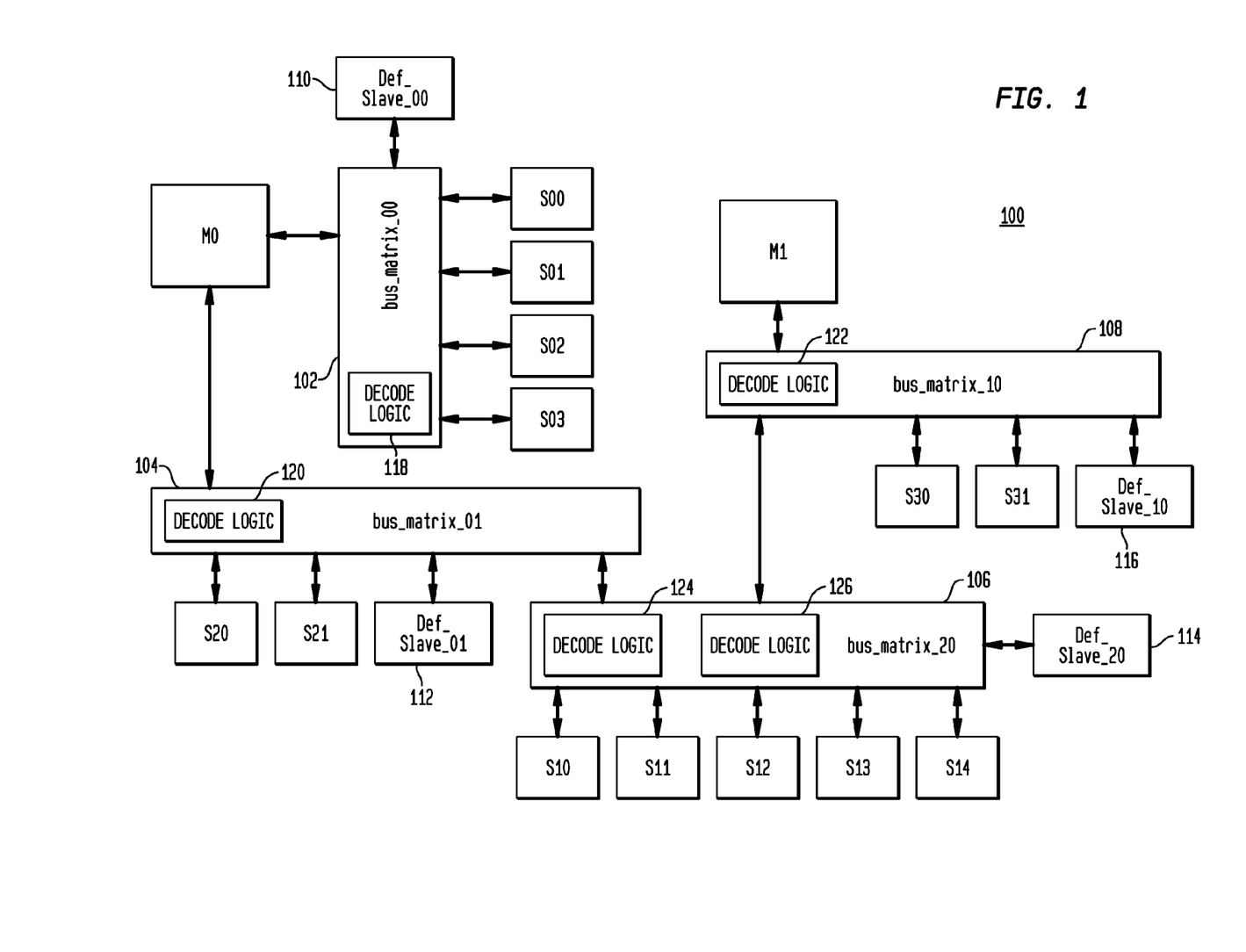
FIG. 1 is a block diagram depicting at least a portion of an exemplary multilayer system-on-chip (SoC) interconnect which can be modified to implement techniques according to embodiments of the invention.

FIG. 1 is a block diagram depicting at least a portion of an exemplary multilayer system-on-chip (SoC) interconnect (i.e., interface) 100 which can be modified to implement techniques according to embodiments of the invention. The SoC interconnect 100 includes two master devices, M0 and M1, and thirteen slave devices, S00 through S03, S10 through S14, S20, S21, S30, and S31. Each slave device is used by one or more corresponding peripherals (not explicitly shown) for communicating (i.e., interfacing) with (e.g., accessed by) one or more corresponding master devices. For example, peripherals associated with slave devices S00 through S03, S20 and S21 communicate only with master device M0. Similarly, peripherals associated with slave devices S30 and S31 communicate only with master device M1. The peripherals associated with slave devices S10 through S14, however, are shared between master devices M0 and M1.

The peripherals associated with slave interfaces S00 through S03 communicate with (e.g., are accessed by) master device M0 through a first bus matrix (bus_matrix__00) 102. A bus matrix, as the term is used herein, is intended to refer broadly to a module or other functional unit comprising several buses in parallel which can support concurrent high bandwidth data paths. Unlike in traditional shared bus architectures, arbitration in the bus matrix is for paths from masters to slaves or slaves to masters, rather than for devices (slaves). Two or more transactions or bus transfers can occur in parallel as long as they don't have any common path segments. Paths between devices (e.g., master to slave or slave to master) may comprise multiple segments. Further, a bus matrix may include one or more of protocol conversion blocks, data width conversion blocks, frequency conversion blocks, data buffering blocks, etc., on these parallel data paths to fulfill prescribed system requirements.

Shared peripherals associated with slave devices S10 through S14 communicate with master device M0 through a second bus matrix (bus_matrix__01) 104 and a third bus matrix (bus_matrix__20) 106, connected in a cascaded (i.e., series) arrangement, and communicate with master device M1 through the third bus matrix 106 and a fourth bus matrix (bus_matrix__10) 108, which are also connected in a cascaded arrangement. The peripherals associated with slave devices S20 and S21 communicate with master device M0 through bus matrix 104, and peripherals associated with slave devices S30 and S31 communicate with master device M1 through bus matrix 108.

Each of the bus matrices 102, 104, 106 and 108 has a corresponding default slave unit connected therewith to generate decode error responses for reserved un-decoded peripheral address space. The un-decoded space is typically reserved space where is no specific peripheral is addressed with this space. When a master tries to access reserved space, as it is not intended for particular peripheral, a transaction response (which may comprise an error response) is delivered by the default slave. Specifically, bus matrix 102 is configured having a first default slave unit (Def_Slave__00) 110 connected therewith, bus matrix 104 has a second default slave unit (Def_Slave__01) 112 connected therewith, bus matrix 106 has a third default slave unit (Def_Slave__20) 114 connected therewith, and bus matrix 108 has a fourth default slave unit (Def_Slave__10) 116 connected therewith.

Each bus matrix comprises decode logic corresponding to a master device data path. More particularly, bus matrix 102 (first bus matrix) includes decode logic 118 associated with a data path from/to master device M0, bus matrix 104 (second bus matrix) includes decode logic 120 associated with a data path from/to master device M0, and bus matrix 108 (fourth bus matrix) includes decode logic 122 associated with a data path from/to master device M1. Furthermore, bus matrix 106 (third bus matrix) uses separate decoding logic, 124 and 126, associated with data paths from/to master devices M0 and M1, respectively.

By way of illustration only, Tables 1 and 2 below depict exemplary address maps of master devices M0 and M1, respectively, for peripheral accesses. It is to be understood that the invention is not limited to these or any specific address mappings.

TABLE 1

| M0 Address Map | | |
|---|---|---|
| Address Map | Memory Size | Slave Name |
| 0x0000__0000-0x6FFF__FFFF | 1.75 GB | Reserved(R00) |
| 0x7000__0000-0x700F__FFFF | 1 MB | S00 |
| 0x7010__0000-0x701F__FFFF | 1 MB | S01 |
| 0x7020__0000-0x703F__FFFF | 2 MB | S02 |
| 0x7040__0000-0x704F__FFFF | 1 MB | S03 |
| 0x7050__0000-0x70FF__FFFF | 11 MB | Aliased to S03 |
| 0x7100__0000-0x7FFF__FFFF | 240 MB | Reserved(R01) |
| 0x8000__0000-0x8000__0FFF | 4 KB | S10 |
| 0x8000__1000-0x8000__1FFF | 4 KB | S11 |
| 0x8000__2000-0x8000__2FFF | 4 KB | S12 |
| 0x8000__3000-0x8000__3FFF | 4 KB | S13 |
| 0x8000__4000-0x8000__4FFF | 4 KB | S14 |
| 0x8000__5000-0x8000__FFFF | 44 KB | Reserved(R02) |
| 0x9000__0000-0x9FFF__FFFF | 256 MB | S20 |
| 0xA000__0000-0xAFFF__FFFF | 256 MB | S21 |
| 0xB000__0000-0xFFFF__FFFF | 1.25 GB | Reserved(R03) |

TABLE 2

M1 Address Map

| Address Map | Memory Size | Slave Name |
|---|---|---|
| 0x0000_0000-0x8FFF_FFFF | 2.25 GB | Reserved(R10) |
| 0x9000_0000-0x9000_0FFF | 4 KB | S10 |
| 0x9000_1000-0x9000_1FFF | 4 KB | S11 |
| 0x9000_2000-0x9000_2FFF | 4 KB | S12 |
| 0x9000_3000-0x9000_3FFF | 4 KB | S13 |
| 0x9000_4000-0x9000_4FFF | 4 KB | S14 |
| 0x9000_5000-0x9000_FFFF | 44 KB | Reserved(R11) |
| 0xA000_0000-0xAFFF_FFFF | 256 MB | S30 |
| 0xB000_0000-0xBFFF_FFFF | 256 MB | S31 |
| 0xC000_0000-0xFFFF_FFFF | 1 GB | Reserved(R12) |

For master device M0, error responses for reserved spaces R00, R01, R02 and R03 are generated by bus matrix 104 using default slave unit 112. Similarly, for master device M1, error responses for reserved spaces R10, R11, and R12 are generated by bus matrix 108 using default slave unit 116.

The peripherals S00 through S03 are directly coupled to master device M0 through bus matrix 102. Typically, processor-based masters support low-latency interfaces for accessing time-critical peripherals. These low-latency peripherals typically include, but are not limited to, an interrupt controller, mail box, memories, etc. For accessing these peripherals, masters support configurable address maps, so that when access falls under this configurable address map range, access is performed onto low-latency interfaces.

With reference to the exemplary address mapping shown in Table 1 above, for accessing slave devices (i.e., peripherals) S00 through S03, master device M0 sends addresses within an address range 0x7000_0000 to 0x70FF_FFFF to bus matrix 102. In all peripherals S00 through S03, the lower 20 bits of the address range, namely, bits [19:0], are common for addressing a memory size of 1 MB. Hence, bus matrix 102 uses the upper 12 bits, namely, bits [31:20], for decoding the peripherals S00 through S03. More particularly, the upper twelve bits (i.e., twelve most significant bits), namely, 0x700, 0x701, 0x702-0x703, and 0x704-0x70F, uniquely identifies slave devices S00, S01, S02 and S03, respectively. The other address ranges, namely, 0x000 to 0x6FF and 0x710 to 0xFFF, are handled using the default slave unit 110.

In this illustrative embodiment, since the master device M0 performs accesses within only a configured address range (e.g., 0x7000_0000 to 0x70FF_FFFF) onto bus matrix 102, bus matrix 102 need not decode other address ranges, and thus there is essentially no need for the default slave unit 110. Hence, in accordance with embodiments of the invention, to avoid the necessity of a default slave unit, the bus matrix associated with a given master device is operative to treat a configured address map as a full address map of the system. For example, in the case of master device M0, the corresponding bus matrix 102 is operative to treat the configured address map, 0x7000_0000 to 0x70FF_FFFF, as the full address map, 0x0000_0000 to 0xFFFF_FFFF. This is achieved, in an embodiment of the invention, by swapping bits [23:20] with bits [31:28] of the address, as will be explained in further detail below. It is to be appreciated that a full address map definition varies based on the system implementation. In the illustrative embodiment described herein, a 32-bit system is considered. For a 64-bit system, as an alternative embodiment, a full address map will comprise an address range of 0x0 to 0xFFFF_FFFF_FFFF_FFFF.

Furthermore, peripherals (i.e., slave devices) S10 through S14 communicate with master device M0 through cascaded interconnects, including bus matrix 104 and bus matrix 106, as previously described. In this example, address decoding occurs in both bus matrices 104 and 106. Bus matrices 104 and 106 use the upper 20 bits (e.g., bits [31:12]) of the address for decoding the corresponding peripherals S10 through S14. Since bus matrix 104 decodes bits [31:12], subsequent decoding leads to redundancy in the address decoding process. Also, bus matrix 106 allocates default slave unit 114 to generate decode error responses. Similarly, for master device M1, accesses to peripherals S10 through S14 include redundancy in the address decoding while access passes through cascaded bus matrices 108 and 106. Embodiments of the invention beneficially remove these redundancies while eliminating a need for the default slave unit associated with a given bus matrix, as will be described further herein.

By way of illustration only and without loss of generality, Table 3 below depicts an exemplary address map for slave devices (i.e., peripherals) S00 through S03 corresponding to bus matrix 102. It is to be understood that embodiments of the invention are not limited to these or any specific address mappings.

TABLE 3

S00-S03 Address map for bus_matrix_00

| Address Map (S00-S03) | Memory Size | Slave Name |
|---|---|---|
| SET0 (Address as per System Map) | | |
| 0x7000_0000-0x700F_FFFF | 1 MB | S00 |
| 0x7010_0000-0x701F_FFFF | 1 MB | S01 |
| 0x7020_0000-0x703F_FFFF | 2 MB | S02 |
| 0x7040_0000-0x704F_FFFF | 1 MB | S03 |
| 0x7050_0000-0x70FF_FFFF | 11 MB | Aliased to S03 |
| SET1 (Address Seen by Bus Matrix) | | |
| 0x0070_0000-0x007F_FFFF | 1 MB | S00 |
| 0x1070_0000-0x107F_FFFF | 1 MB | S01 |
| 0x2070_0000-0x307F_FFFF | 2 MB | S02 |
| 0x4070_0000-0x407F_FFFF | 1 MB | S03 |
| 0x5070_0000-0xF07F_FFFF | 11 MB | Aliased to S03 |
| SET2 (Address Seen by Bus Matrix) | | |
| 0x0700_0000-0x070F_FFFF | 1 MB | S00 |
| 0x1700_0000-0x170F_FFFF | 1 MB | S01 |
| 0x2700_0000-0x370F_FFFF | 2 MB | S02 |
| 0x4700_0000-0x470F_FFFF | 1 MB | S03 |
| 0x5700_0000-0xF70F_FFFF | 11 MB | Aliased to S03 |

Table 3 includes three sets of address mappings, namely, SET0, SET1 and SET2. Mapping SET0 includes addresses as defined by a system address map and as seen by bus matrix 102 using a traditional decoding scheme. SET1 and SET2 are possible address maps seen by bus matrix 102 in accordance with an embodiment of the invention. In SET0, address bits [23:20] (the most significant bit (MSb) being the left-most bit) are sufficient to uniquely decode the peripherals S00 through S03 against a traditional decoding of address bits [31:20]. In general, bus matrices are generated through configurable tools which typically do not support direct decoding of specific address bits. Hence, essentially all matrices decode a complete address range. An address in a range falling outside the specified address range (e.g., an address in ranges 0x0000_0000 to 0x6FFF_FFFF and 0x8000_0000 to 0xFFFF_FFFF falls outside the specified address range 0x7000_0000 to 0x70FF_FFFF) in SET0 is generated with a decode error response by the default slave unit 110.

To limit the address decoding to only a required number of bits (in the current illustrative embodiment, bits [23:20]), the corresponding bus matrix should see the required address range as a complete (i.e., full) address range. In the present embodiment, for example, bus matrix 102 sees address range 0x7000_0000 to 0x70FF_FFFF as address range 0x0000_0000 to 0xFFFF_FFFF. This can be achieved by swapping one or more bits of the actual address. Mappings SET1 and SET2 show two possible address ranges seen by bus matrix 102 after swapping a few address bits.

In address mapping SET1, with respect to SET0, address bits [23:20] are swapped with address bits [31:28]. Similarly, in address mapping SET2, with respect to mapping SET0, address bits [23:20] are moved to bit locations [31:28], and address bits [31:24] are moved to bit locations [27:20]. In both SET1 and SET2, the address bits [31:28] uniquely identify the peripherals S00 through S03.

By way of illustration only and without limitation, Table 4 below depicts an exemplary address map decoding used by bus matrix 102 in address mapping sets SET0, SET1 and SET2, according to an embodiment of the invention.

TABLE 4

S00-S03 Address map decoding by bus_matrix_00

| Address Map (S00-S03) | Memory Size | Slave Name |
|---|---|---|
| SET0 (Peripheral decoding) | | |
| 0x700x_xxxx-0x700x_xxxx | 1 MB | S00 |
| 0x701x_xxxx-0x701x_xxxx | 1 MB | S01 |
| 0x702x_xxxx-0x703x_xxxx | 2 MB | S02 |
| 0x704x_xxxx-0x704x_xxxx | 1 MB | S03 |
| 0x705x_xxxx-0x70Fx_xxxx | 11 MB | Aliased to S03 |
| SET1 and SET2 (Peripheral decoding) | | |
| 0x0xxx_xxxx-0x0xxx_xxxx | 256 MB | S00 |
| 0x1xxx_xxxx-0x1xxx_xxxx | 256 MB | S01 |
| 0x2xxx_xxxx-0x3xxx_xxxx | 512 MB | S02 |
| 0x4xxx_xxxx-0x4xxx_xxxx | 256 MB | S03 |
| 0x5xxx_xxxx-0xFxxx_xxxx | 2.75 GB | Aliased to S03 |

In address mapping SET0, the address bits [31:20] uniquely decode slave devices (i.e., peripherals) S00 through S03. In address mappings SET1 and SET2, the address bits [31:28] uniquely decode the slave devices S00 through S03. Moreover, in mappings SET1 and SET2, address decoding for the slave devices S00 through S03 covers a complete address space. Hence, bus matrix 102 does not require a default slave module to generate decode error responses. Further, in SET1 and SET2, address decoding logic reduces the required decoding logic and improves an access time for accessing slave devices S00 through S03.

By way of illustration only and without limitation, Table 5 below depicts an exemplary system address map decoding corresponding to master devices M0 and M1 for communicating with (i.e., accessing) slave devices S10 through S14, according to an embodiment of the invention. As previously described, slave devices S10 through S14 can be accessed by either master device M0 or M1 via cascaded bus matrices 104 and 106, or cascaded bus matrices 108 and 106, respectively.

TABLE 5

| Address Map (S10-S14) | Memory Size | Slave Name |
|---|---|---|
| M0 Address Map | | |
| 0x8000_0000-0x8000_0FFF | 4 KB | S10 |
| 0x8000_1000-0x8000_1FFF | 4 KB | S11 |
| 0x8000_2000-0x8000_2FFF | 4 KB | S12 |
| 0x8000_3000-0x8000_3FFF | 4 KB | S13 |
| 0x8000_4000-0x8000_4FFF | 4 KB | S14 |

TABLE 5-continued

| Address Map (S10-S14) | Memory Size | Slave Name |
|---|---|---|
| M1 Address Map | | |
| 0x9000_0000-0x9000_0FFF | 4 KB | S10 |
| 0x9000_1000-0x9000_1FFF | 4 KB | S11 |
| 0x9000_2000-0x9000_2FFF | 4 KB | S12 |
| 0x9000_3000-0x9000_3FFF | 4 KB | S13 |
| 0x9000_4000-0x9000_4FFF | 4 KB | S14 |

As apparent from Table 5, master device M0 accesses corresponding slave devices S10 through S14 through address map range 0x8000_0000 to 0x8000_4FFF using bus matrices 104 and 106. Likewise, master device M1 accesses corresponding slave devices S10 through S14 through address map range 0x9000_0000 to 0x9000_4FFF using bus matrices 108 and 106.

By way of illustration only and without limitation, Table 6 below depicts an exemplary address map decoding by bus matrix 106 according to a traditional method used by master devices M0 and M1 for accessing slave devices S10 through S14.

TABLE 6

| Address Map (S00-S14) | Memory Size | Slave Name |
|---|---|---|
| M0 Address Map | | |
| 0x8000_0xxx-0x8000_0xxx | 4 KB | S10 |
| 0x8000_1xxx-0x8000_1xxx | 4 KB | S11 |
| 0x8000_2xxx-0x8000_2xxx | 4 KB | S12 |
| 0x8000_3xxx-0x8000_3xxx | 4 KB | S13 |
| 0x8000_4xxx-0x8000_4xxx | 4 KB | S14 |
| M1 Address Map | | |
| 0x9000_0xxx-0x9000_0xxx | 4 KB | S10 |
| 0x9000_1xxx-0x9000_1xxx | 4 KB | S11 |
| 0x9000_2xxx-0x9000_2xxx | 4 KB | S12 |
| 0x9000_3xxx-0x9000_3xxx | 4 KB | S13 |
| 0x9000_4xxx-0x9000_4xxx | 4 KB | S14 |

As apparent from Table 6, the most significant (i.e., upper) 20 bits of the address, namely, bits [31:12], are used for address decoding. For master device M0, address decoding is performed by bus matrices 104 and 106, and for master device M1, address decoding is performed by bus matrices 108 and 106. Since bus matrix 104 (for M0) and bus matrix 108 (for M1) each decode in a first level using the most significant 20 bits [31:12] of the address, decoding these bits again in bus matrix 106 creates a redundancy which adds additional timing overhead on timing-critical paths.

To remove this redundancy, decoding is restricted to only a required subset of bits. With reference to Table 5 above, by restricting the decoding to three address bits, namely, bits [14:12], slave devices (i.e., peripherals) S10 through S14 can be uniquely accessed. Since bus matrix 106 is ordinarily adapted to decode a complete address map (32 bits in this illustrative embodiment) for peripheral selection, to restrict the decoding logic to bits [14:12], these bits must be swapped. Table 7 below depicts an illustrative method of swapping for accessing slave devices S10 through S14.

TABLE 7

| Address Map (S10-S14) | Memory Size | Slave Name |
|---|---|---|
| M0 Address Map | | |
| 0x0000_4000-0x0000_4FFF | 4 KB | S10 |
| 0x2000_4000-0x2000_4FFF | 4 KB | S11 |

TABLE 7-continued

| Address Map (S10-S14) | Memory Size | Slave Name |
|---|---|---|
| 0x4000_4000-0x4000_4FFF | 4 KB | S12 |
| 0x6000_4000-0x6000_4FFF | 4 KB | S13 |
| 0x8000_4000-0x8000_4FFF | 4 KB | S14 |
| M1 Address Map | | |
| 0x0000_C000-0x0000_CFFF | 4 KB | S10 |
| 0x2000_C000-0x2000_CFFF | 4 KB | S11 |
| 0x4000_C000-0x4000_CFFF | 4 KB | S12 |
| 0x6000_C000-0x6000_CFFF | 4 KB | S13 |
| 0x8000_C000-0x8000_CFFF | 4 KB | S14 |

Compared with Table 5, bits [15,14,13,12] in Table 7 are swapped to bits [28,31,30,29] in Table 5, respectively.

By way of illustration only and without limitation, Table 8 below depicts an exemplary address map decoding by bus matrix 106 used by master devices M0 and M1 for accessing slave devices S10 through S14, according to an embodiment of the invention.

TABLE 8

| Address Map (S10-S14) | Memory Size | Slave Name |
|---|---|---|
| M0 Address Map | | |
| 0x[000x]xxx_xxxx (0x0000_0000)-0x[000x]xxx_xxxx(0x1FFF_FFFF) | 512 MB | S10 |
| 0x[001x]xxx_xxxx(0x2000_0000)-0x[001x]xxx_xxxx(0x3FFF_FFFF) | 512 MB | S11 |
| 0x[010x]xxx_xxxx(0x4000_0000)-0x[010x]xxx_xxxx(0x5FFF_FFFF) | 512 MB | S12 |
| 0x[011x]xxx_xxxx(0x6000_0000)-0x[011x]xxx_xxxx(0x7FFF_FFFF) | 512 MB | S13 |
| 0x[100x]xxx_xxxx(0x8000_0000)-0x[111x]xxx_xxxx(0xFFFF_FFFF) | 2 GB | S14 |
| M1 Address Map | | |
| 0x[000x]xxx_xxxx (0x0000_0000)-0x[000x]xxx_xxxx(0x1FFF_FFFF) | 512 MB | S10 |
| 0x[001x]xxx_xxxx(0x2000_0000)-0x[001x]xxx_xxxx(0x3FFF_FFFF) | 512 MB | S11 |
| 0x[010x]xxx_xxxx(0x4000_0000)-0x[010x]xxx_xxxx(0x5FFF_FFFF) | 512 MB | S12 |
| 0x[011x]xxx_xxxx(0x6000_0000)-0x[011x]xxx_xxxx(0x7FFF_FFFF) | 512 MB | S13 |
| 0x[100x]xxx_xxxx(0x8000_0000)-0x[111x]xxx_xxxx(0xFFFF_FFFF) | 2 GB | S14 |

As apparent from Table 8, address decoding is restricted to three bits, namely, bits [31:29]. Moreover, address decoding covers a complete address range; 32 bits in this illustrative embodiment. Consequently, a default slave unit need not be allocated.

Figure 2:
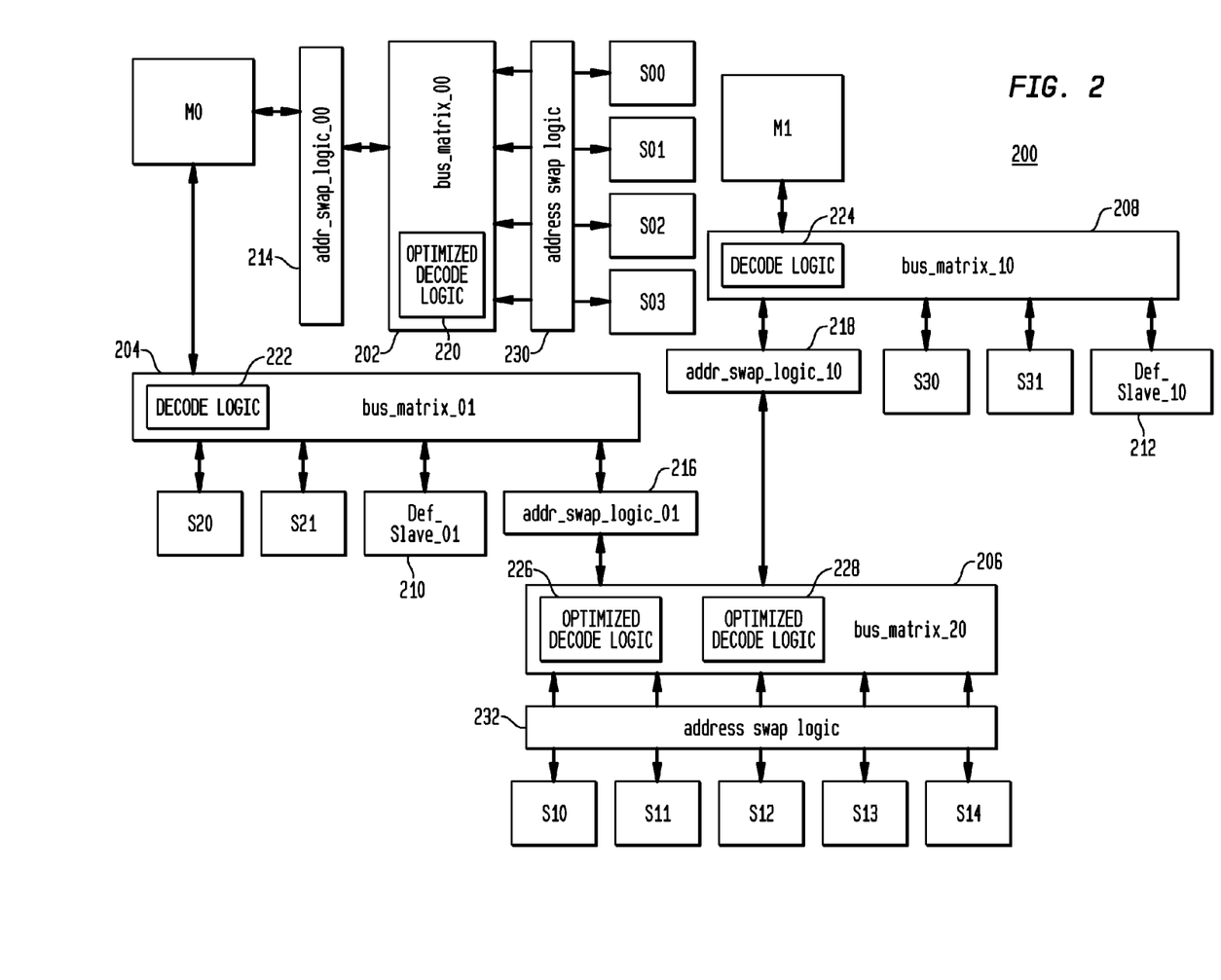
FIG. 2 is a block diagram depicting at least a portion of an exemplary SoC interconnect, according to an embodiment of the invention.

FIG. 2 is a block diagram depicting at least a portion of an exemplary SoC interconnect (i.e., interface) 200, according to an embodiment of the invention. Like the SoC interconnect 100 shown in FIG. 1, SoC interconnect 200 includes two master devices, M0 and M1, and thirteen slave devices, S00 through S03, S10 through S14, S20, S21, S30, and S31. It is to be appreciated that embodiments of the invention are not limited to any specific number of master and/or slave devices. Each slave device is used by one or more corresponding peripherals (not explicitly shown) for communicating (i.e., interfacing) with one or more corresponding master devices. For example, peripherals associated with slave devices S00 through S03, S20 and S21 are accessed only by master device M0. Similarly, peripherals associated with slave devices S30 and S31 are accessed only by master device M1. The peripherals associated with slave devices S10 through S14, however, are shared between master devices M0 and M1.

The peripherals associated with slave devices S00 through S03 communicate with master device M0 through a first bus matrix (bus_matrix_00) 202. Shared peripherals associated with slave devices S10 through S14 communicate with master device M0 through a second bus matrix (bus_matrix_01) 204 and a third bus matrix (bus_matrix_20) 206, connected in a cascaded (i.e., series) arrangement, and communicate with master device M1 through the third bus matrix 206 and a fourth bus matrix (bus_matrix_10) 208, which are also connected in a cascaded arrangement. The slave devices S20 and S21 communicate with master device M0 through bus matrix 204, and the slave devices S30 and S31 communicate with master device M1 through bus matrix 208.

Unlike in the SoC interconnect 100 shown in FIG. 1 wherein each of the bus matrices 102, 104, 106 and 108 requires a corresponding default slave unit connected therewith to generate decode error responses for reserved undecoded peripheral address space, not all bus matrices in the SoC interconnect 200 depicted in FIG. 2 require a default slave unit. Instead, at least a subset of the bus matrices employs an address swapping scheme, embodiments of which were previously described. An address swapping methodology may be performed by an address swapping module (e.g., address swap logic) coupled between a given bus matrix and a corresponding master device, or coupled between corresponding bus matrices, or coupled between one or more slave devices and a corresponding bus matrix, as will be described in further below. Eliminating default slave units in the SoC interconnect 200 beneficially reduces chip area, complexity and power consumption, which are desirable in timing-critical interfaces.

Specifically, bus matrix 204 has a first default slave unit (Def_Slave_01) 210 connected therewith, and bus matrix 208 has a second default slave unit (Def_Slave_10) 212 connected therewith. Bus matrices 202 and 206, however, do not require a default slave unit. Instead, the SoC interconnect 200 includes a first address swapping module (addr_swap_logic_00) 214 connected between bus matrix 202 and master device M0, a second address swapping module (addr_swap_logic_01) 216 connected between bus matrix 206 and bus matrix 204, and a third address swapping module (addr_swap_logic_10) 218 connected between bus matrix 206 and bus matrix 208. A fourth address swapping module 230 is coupled between bus matrix 202 and corresponding slave devices S00 through S03, and a fifth address swapping module 232 is coupled between bus matrix 206 and corresponding slave devices S10 through S14.

Each of the address swapping modules 214, 216, 218, 230 and 232 is operative to perform an address mapping configured such that the address bits uniquely decode corresponding slave devices. More particularly, each of the address swapping modules 214, 216 and 218 is operative to receive an address as per the system address map and to generate therefrom a swapped address which is sent to the corresponding bus matrix. The swapped address, in this instance, assists the corresponding bus matrix to simplify address decoding. Similarly, each of the address swapping modules 230 and 232 is operative to receive an address from a corresponding bus matrix and to generate an original address therefrom as per the system address map. In other words, one or more bits are swapped back again (i.e., reverse swapped), so that the address generated by a given master device and the address seen by a corresponding slave device(s) are the same.

Examples of several address mappings were previously described in conjunction with Tables 1 through 8 above. For instance, address swapping module 214 is operative to perform swapping of address bits [23:20] to bits [31:28], as shown in mapping SET1 of Table 3, or to move address bits [23:20] to bits [31:28] and move bits [31:24] to bits [27:20]. address swapping module 216 is operative to perform swapping of address bits [15:12] to bit [31:28], as shown in Table 7 for master devices M0 and M1. Address decoding for the slave devices is operative to cover a complete address space, thereby eliminating the need for a default slave unit to generate decode error responses.

Each bus matrix comprises decode logic corresponding to at least one master device data path. Specifically, bus matrix 202 includes a first decode logic block 220 associated with a data path from/to master device M0, bus matrix 204 includes a second decode logic block 222 associated with a data path from/to master device M0, and bus matrix 208 includes a third decode logic block 224 associated with a data path from/to master device M1. Unlike in the SoC interconnect 100 shown in FIG. 1, however, for the illustrative embodiment in which the address decoding logic resides at the slave interface rather than at the master interface, the bus matrices in the SoC interconnect 200 do not require separate decode logic blocks for each master device data path.

For example, bus matrix 206 includes a fourth decode logic block 226 and a fifth decode logic block 228 associated with data paths from/to master devices M0 and M1, respectively. Address decode logic block 220 in bus matrix 202 and decode logic blocks 226 and 228 in bus matrix 206 are beneficially configured (e.g., optimized) to reduce the required decoding logic and improve access time for accessing slave devices S00 through S03 (via bus matrix 202) or slave devices S10 through S14 (via bus matrix 206). More particularly, decode logic block 220, in this embodiment, is operative to decode four address bits, namely, bits [31:28] shown in Table 4 (mappings SET1 and SET2), compared to a standard decoding of twelve bits, namely, bits [31:20] in mapping SET0 of Table 4. Similarly, decode logic blocks 226 and 228 are operative to decode three address bits, namely, bits [31:29] shown in Table 8, compared to the standard decoding of twenty bits, namely, bits [31:12] shown in Table 6.

The plurality of address swapping modules 214, 216, 218, 230 and 232, collectively, form at least a portion of an apparatus that is configured so as to eliminate the need for any given master device in the system 200 to have more than one default slave unit operatively coupled therewith.

Figure 3:
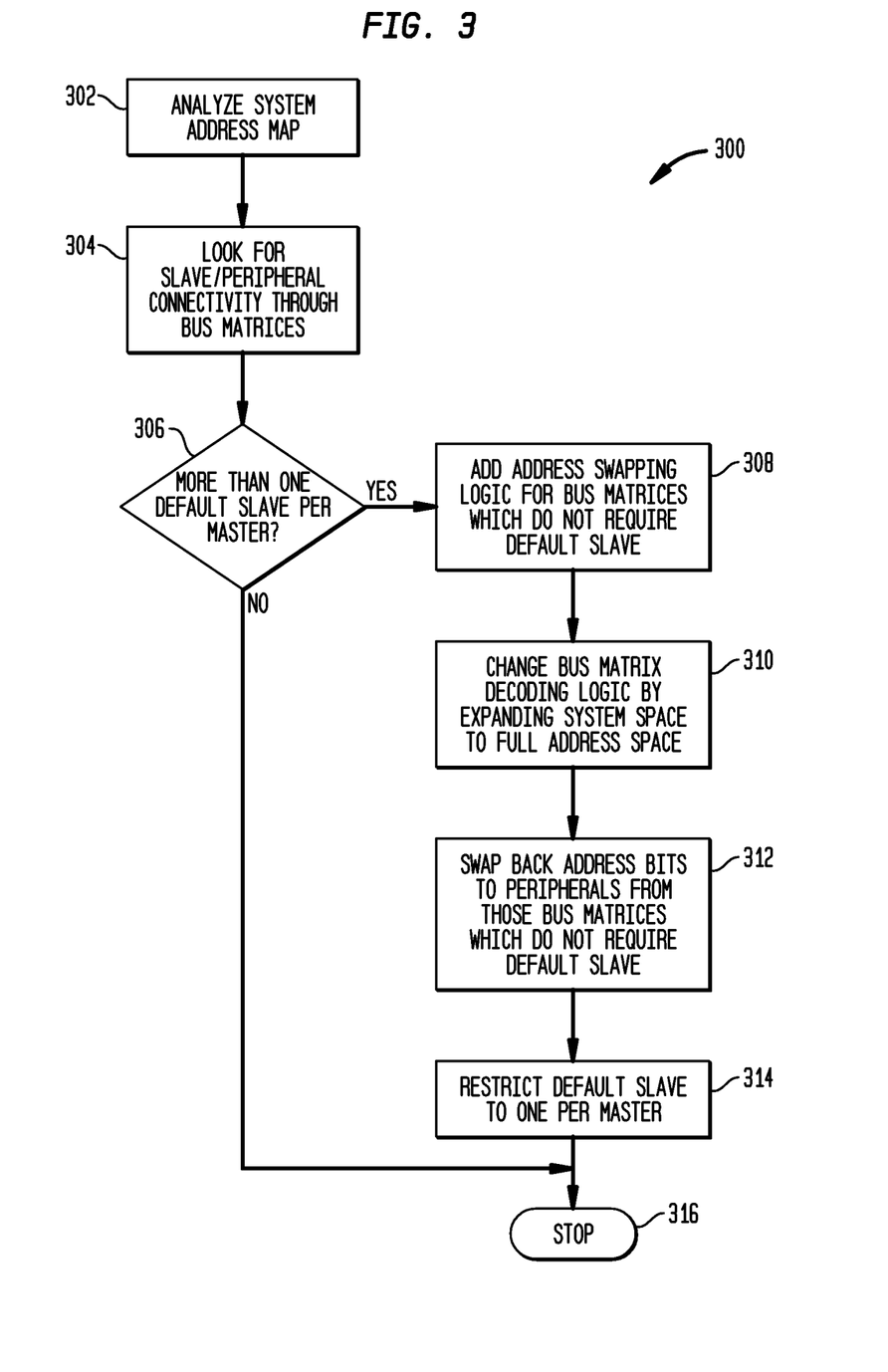
FIG. 3 is a flow diagram depicting at least a portion of an exemplary memory mapping methodology, according to an embodiment of the invention.

With reference now to FIG. 3, at least a portion of a flow diagram depicting an exemplary system memory mapping methodology 300 is shown, according to an embodiment of the invention. Method 300 begins in step 302, wherein an address map for the system is obtained (e.g., received) and analyzed. From the system address map, slave (i.e., peripheral) device connectivity through corresponding bus matrices is determined in step 304. Next, in step 306 the method 300 determines whether the system includes more than one default slave unit per master device.

When step 306 determines that there is more than one default slave device per master device, the method 300 continues in step 308 to add address swapping logic for bus matrices that do not require a default slave unit. Additionally, decoding logic included in those bus matrices which do not require a default slave unit is changed by expanding their system space to a full address space in step 310. In step 312, method 300 swaps back address bits to peripherals from those bus matrices which do not require default slave units. In step 314, the system is configured so as to restrict the default slave units to one per master device. After step 314, the method 300 ends at 316. Likewise, when step 306 determines that there is not more than one default slave device per master device, not further action is required and the method 300 ends at 316.

As indicated above, embodiments of the invention can employ hardware or hardware and software aspects. Software includes but is not limited to firmware, resident software, microcode, etc. One or more embodiments of the invention or portions thereof may be implemented in the form of an article of manufacture including a machine readable medium that contains one or more programs which when executed implement method step(s) used to perform at least portions of embodiments of the invention; that is to say, a computer program product including a tangible computer readable recordable storage medium (or multiple such media) with computer usable program code stored thereon in a non-transitory manner for performing one or more of the method steps indicated. Furthermore, one or more embodiments of the invention or elements thereof can be implemented in the form of an apparatus including a memory and at least one processor (e.g., master device) that is coupled with the memory and operative to perform, or facilitate the performance of, exemplary method steps.

As used herein, "facilitating" an action includes performing the action, making the action easier, helping to carry out the action, or causing the action to be performed. Thus, by way of example only and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 4:
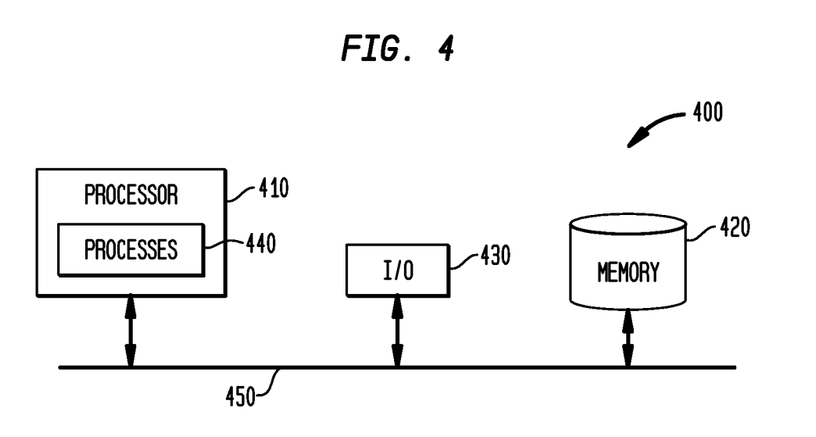
FIG. 4 is a block diagram depicting at least a portion of an exemplary processing system, formed in accordance with an embodiment of the invention.

Embodiments of the invention may be particularly well-suited for use in an electronic device or alternative system (e.g., multilayer and multilevel interconnect systems, memory storage systems, etc.). For example, FIG. 4 is a block diagram depicting at least a portion of an exemplary processing system 400 according to an embodiment of the invention. System 400, which may represent, for example, a multilayer system-on-chip (SoC) interconnect, or a portion thereof, includes a processor 410 (e.g., master device M0 or M1), memory 420 coupled with the processor (e.g., via a bus 450 or alternative connection means) or embedded in the processor, as well as input/output (I/O) circuitry 430 operative to interface with the processor. The processor 410 may be configured to perform at least a portion of the functions according to embodiments of the invention (e.g., by way of one or more processes 440 which may be stored in memory 420 and loaded into processor 410), illustrative embodiments of which are shown in the previous figures and described herein above.

It is to be appreciated that the term "processor" as used herein is intended to include any processing device, such as, for example, one that includes a CPU and/or other processing circuitry (e.g., network processor, microprocessor, digital signal processor, etc.). Additionally, it is to be understood that a processor may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., display, etc.) for presenting the results associated with the processor.

Accordingly, an application program, or software components thereof, including instructions or code for performing the methodologies of embodiments of the invention, as described herein, may be stored in a non-transitory manner in one or more of the associated storage media (e.g., ROM, fixed or removable storage) and, when ready to be utilized, loaded in whole or in part (e.g., into RAM) and executed by the processor. In any case, it is to be appreciated that at least a portion of the components shown in the previous figures may be implemented in various forms of hardware, software, or combinations thereof (e.g., one or more microprocessors with associated memory, application-specific integrated circuit(s) (ASICs), functional circuitry, one or more operatively programmed general purpose digital computers with associated memory, etc). Given the teachings of the embodiments of the invention provided herein, one of ordinary skill in the art will be able to contemplate other implementations of the embodiments of the invention.

At least a portion of the techniques of the embodiments of the invention may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, then packaged as an integrated circuit. One skilled in the art would know how to dice wafers and package die to produce integrated circuits. Integrated circuits so manufactured are considered part of this invention.

An integrated circuit in accordance with embodiments of the invention can be employed in essentially any application and/or electronic system in which SoC interconnects or IP devices may be employed. Suitable systems for implementing techniques of embodiments of the invention may include, but are not limited to, servers, personal computers, mobile phones, hard disk controllers, data storage networks, etc. Systems incorporating such integrated circuits are considered part of embodiments of the invention. Given the teachings of embodiments of the invention provided herein, one of ordinary skill in the art will be able to contemplate other implementations and applications of the techniques of embodiments of the invention.

The illustrations of embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the inventive subject matter are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A method for mapping addresses between one or more slave devices and at least one corresponding master device in a multilayer interconnect system, the system including a plurality of bus matrices for interfacing between the one or more slave devices and the at least one master device, the method comprising steps of:

receiving an address map corresponding to the system;

receiving information regarding connectivity of at least a subset of the one or more slave devices through at least one of the plurality of bus matrices;

determining whether the at least one master device has more than one default slave unit associated therewith; and when the at least one master device has more than one default slave unit associated therewith:

generating a first address mapping defining a correspondence between an address space utilized by the at least one master device and an address space utilized by a corresponding bus matrix that does not require a default slave unit;

generating a second address mapping defining a correspondence between an address space utilized by the bus matrix that does not require a default slave unit and an address space used to access a corresponding one of the slave devices, such that an address generated by the at least one master device and an address seen by a corresponding one of the slave devices is the same; and configuring the system to have no more than one default slave unit per master device.

2. The method of claim 1, wherein the step of generating the first address mapping comprises at least one of swapping and shifting two or more bits in an address received from the at least one master device by a corresponding bus matrix that does not require a default slave unit, such that the address generated by the corresponding bus matrix utilizes full address space as per the address map corresponding to the system.

3. The method of claim 2, wherein performing at least one of swapping and shifting two or more bits in an address received from the at least one master device by a corresponding bus matrix that does not require a default slave unit comprises modifying address decoding logic in the corresponding bus matrix that does not require a default slave unit by expanding a system address space of the corresponding bus matrix that does not require a default slave unit to full address space as per the address map corresponding to the system.

4. The method of claim 2, wherein the step of generating the first address mapping comprises receiving an address as per the address map corresponding to the system and generating therefrom a swapped address that is sent to the corresponding bus matrix that does not require a default slave unit.

5. The method of claim 1, wherein the step of generating the second address mapping comprises at least one of swapping and shifting back two or more bits in an address received from the bus matrix that does not require a default slave unit by the corresponding one of the slave devices, such that the corresponding one of the slave devices is accessed as per the address map corresponding to the system.

6. The method of claim 1, wherein the steps of generating the first and second address mappings comprise adding first and second address swapping logic, respectively, coupled with each of at least a subset of the bus matrices that do not require a default slave unit, the first address swapping logic being connected between the at least one master device and a given one of the bus matrices that do not require a default slave unit, the second address swapping logic being connected between the given one of the bus matrices that do not require a default slave unit and corresponding slave devices.

7. The method of claim 6, wherein the first and second address swapping logic are configured for removing redundancy in address decoding along with the default slave unit.

8. The method of claim 1, further comprising, when there are at least two bus matrices coupled in series between the at least one master device and one or more corresponding slave devices being accessed by the at least one master device, removing an address decoding redundancy by restricting a number of bits used for decoding by a given one of the at least two bus matrices to access the one or more corresponding slave devices.

9. The method of claim 8, wherein the number of bits used by one of the at least two bus matrices to access the one or more corresponding slave devices is a function of a number of slave devices coupled with the given one of the at least two bus matrices.

10. An apparatus for facilitating address mapping between at least one master device and one or more corresponding slave devices in a multilayer interconnect system, the system including a plurality of bus matrices for interfacing between the one or more slave devices and the at least one master device, the apparatus comprising:

a plurality of address swapping modules, a first subset of the address swapping modules being connected between the at least one master device and corresponding bus matrices that do not require a default slave unit, a second subset of the address swapping modules being connected between the corresponding bus matrices that do not require a default slave unit and corresponding slave devices, the address swapping modules being adapted to perform at least one of: generating a first address mapping defining a correspondence between an address space utilized by the at least one master device and an address space utilized by a corresponding bus matrix that does not require a default slave unit; and generating a second address mapping defining a correspondence between an address space utilized by the bus matrix that does not require a default slave unit and an address space used to access a corresponding one of the slave devices, such that an address generated by the at least one master device and an address seen by a corresponding one of the slave devices is the same;

wherein the plurality of address swapping modules are configured so as to eliminate a need for the at least one master device to have more than one default slave unit operatively coupled therewith.

11. The apparatus of claim 10, wherein the first address mapping is performed by the first subset of the address swapping modules, the first subset of the address swapping modules being operative to at least one of swap and shift two or more bits in an address received from the at least one master device by a corresponding bus matrix that does not require a default slave unit, such that the address generated by the corresponding bus matrix utilizes full address space as per an address map corresponding to the system.

12. The apparatus of claim 10, wherein the second address mapping is performed by the second subset of the address swapping modules, the second subset of the address swapping modules being operative to at least one of swap and shift back two or more bits in an address received from the bus matrix that does not require a default slave unit by the corresponding one of the slave devices, such that the corresponding one of the slave devices is accessed as per an address map corresponding to the system.

13. The apparatus of claim 10, wherein, when there are at least two bus matrices coupled in series between the at least one master device and one or more corresponding slave devices being accessed by the at least one master device, a first one of the address swapping modules is connected between a first one of the at least two bus matrices and a second one of the at least two bus matrices, and a second one of the address swapping modules is connected between the second one of the at least two bus matrices and the one or more corresponding slave devices.

14. A multilayer interconnect system, comprising:
at least one master device;
a plurality of slave devices;
a plurality of bus matrices operative to interface between the plurality of slave devices and the at least one master device; and a plurality of address swapping modules, a first subset of the address swapping modules being connected between the at least one master device and corresponding bus matrices that do not require a default slave unit, a second subset of the address swapping modules being connected between the corresponding bus matrices that do not require a default slave unit and corresponding slave devices, the address swapping modules being adapted to perform at least one of: generating a first address mapping defining a correspondence between an address space utilized by the at least one master device and an address space utilized by a corresponding bus matrix that does not require a default slave unit; and generating a second address mapping defining a correspondence between an address space utilized by the bus matrix that does not require a default slave unit and an address space used to access a corresponding one of the slave devices, such that an address generated by the at least one master device and an address seen by a corresponding one of the slave devices is the same;

wherein the plurality of address swapping modules are configured so as to eliminate a need for the at least one master device to have more than one default slave unit operatively coupled therewith.

15. The system of claim 14, wherein the first address mapping is performed by the first subset of the address swapping modules, the first subset of the address swapping modules being operative to at least one of swap and shift two or more bits in an address received from the at least one master device by a corresponding bus matrix that does not require a default slave unit, such that the address generated by the corresponding bus matrix utilizes full address space as per an address map corresponding to the system.

16. The system of claim 14, wherein the second address mapping is performed by the second subset of the address swapping modules, the second subset of the address swapping modules being operative to at least one of swap and shift back two or more bits in an address received from the bus matrix that does not require a default slave unit by the corresponding one of the slave devices, such that the corresponding one of the slave devices is accessed as per an address map corresponding to the system.

17. The system of claim 14, wherein, when at least two of the bus matrices are coupled in series between the at least one master device and one or more corresponding slave devices being accessed by the at least one master device, a first one of the address swapping modules is connected between a first one of the at least two bus matrices and a second one of the at least two bus matrices, and a second one of the address swapping modules is connected between the second one of the at least two bus matrices and the one or more corresponding slave devices.

18. The system of claim 14, wherein at least a first and second one of the plurality of address swapping modules are implemented within a given one of the plurality of bus matrices which does not require a default slave unit.

19. The system of claim 14, wherein at least a given one of the plurality of address swapping modules is connected between two bus matrices.

20. The system of claim 14, wherein the system utilizes a unified system address map, and wherein a single default slave unit is shared among all master devices in the system.

21. An integrated circuit including at least one apparatus for facilitating address mapping between at least one master device and one or more corresponding slave devices in a multilayer interconnect system, the system including a plurality of bus matrices for interfacing between the one or more slave devices and the at least one master device, the at least one apparatus comprising:

a plurality of address swapping modules, a first subset of the address swapping modules being connected between the at least one master device and corresponding bus matrices that do not require a default slave unit, a second subset of the address swapping modules being connected between the corresponding bus matrices that do not require a default slave unit and corresponding slave devices, the address swapping modules being adapted to perform at least one of: generating a first address mapping defining a correspondence between an address space utilized by the at least one master device and an address space utilized by a corresponding bus matrix that does not require a default slave unit; and generating a second address mapping defining a correspondence between an address space utilized by the bus matrix that does not require a default slave unit and an address space used to access a corresponding one of the slave devices, such that an address generated by the at least one master device and an address seen by a corresponding one of the slave devices is the same;

wherein the plurality of address swapping modules are configured so as to eliminate a need for the at least one master device to have more than one default slave unit operatively coupled therewith.

\* \* \* \* \*